United States Patent [19]

Muramatsu et al.

[11] Patent Number: 5,718,314
[45] Date of Patent: Feb. 17, 1998

[54] ONE-WAY CLUTCH FOR STATOR

[75] Inventors: Kazuhiko Muramatsu; Yoshio Kinoshita, both of Shizuoka, Japan

[73] Assignee: NSK-Warner Kabushiki Kaisha, Tokyo, Japan

[21] Appl. No.: 641,494

[22] Filed: May 1, 1996

[30] Foreign Application Priority Data

May 2, 1995 [JP] Japan ................... 7-131161

[51] Int. Cl.⁶ ............................................. F16D 41/07
[52] U.S. Cl. ................................................. 192/45.1
[58] Field of Search ............................ 192/45.1, 41 A

[56] References Cited

U.S. PATENT DOCUMENTS 2,633,952  4/1953  Zeidler ....................... 192/45.1
2,724,472  11/1955  Swenson ...................... 192/45.1
4,441,315  4/1984  Bochot ........................ 60/345

FOREIGN PATENT DOCUMENTS 632112     12/1961  Canada ........................ 192/45.1
0 575 037 A1  12/1993  European Pat. Off. ....... 192/45.1

Primary Examiner—Richard M. Lorence
Attorney, Agent, or Firm—Sughrue, Mion, Zinn, Macpeak & Seas, PLLC

[57] ABSTRACT

The one-way clutch for use in a stator of a torque converter includes a series of cam members respectively arranged at regular intervals in the circumferential direction of the one-way clutch and extending in the axial direction of the one-way clutch, a plurality of sprags respectively received in openings which are also respectively formed between the cam members, and a cage ring structured to hold a plurality of urging elements respectively for supporting the sprags within the openings.

11 Claims, 3 Drawing Sheets

5,718,314

ONE-WAY CLUTCH FOR STATOR

BACKGROUND OF THE INVENTION

1. Field of the Invention

The present invention relates to a one-way clutch for a stator of a torque converter and the like.

2. Description of the Related Art

Conventionally, in a torque converter of a vehicle, a one-way clutch is generally used as a back stop of a stator.

FIG. 5 is a section view showing a conventional one-way clutch assembly for a stator. In FIG. 5, reference numeral 10 designates a sprag clutch of a double cage type; 2, an outer race; 3, an inner race; 4, a thrust needle; and 5, a bush which is used not only as a support member for the inner and outer races 3, 2 but also as a backup member for the thrust needle 4.

The conventional sprag clutch 10 of a double cage type includes only a sprag and a double cage for holding the sprag but does not perform a function of supporting the outer race 2 and inner race 3. Therefore, the bush 5 must function to support the outer race 2 and inner race 3 as well as function to back up the thrust needle 4. As a result, the bush 5 must have a complicated shape as well as an increased cost. A one-way clutch so structured is relatively long in the axial direction.

SUMMARY OF THE INVENTION

It is an object of the invention to provide a one-way clutch for a stator which make it possible to simplify the structure of a bush and to reduce the axial length of the whole one-way clutch assembly.

According to the present invention, a one-way clutch for a stator of a torque converter comprises a series of cam members arranged at regular intervals in the circumferential direction of the one-way clutch and extending in the axial direction thereof; a plurality of sprags respectively stored in openings which are respectively formed between the cam members; and a cage ring holding energizing elements which are respectively used to support the sprags in the openings.

Since the one-way clutch assembly of the invention is structured in the above-mentioned manner and includes an integrally formed cage ring having a function of supporting the inner and outer races, the bush structure need not have a function of supporting the inner and outer races. The structure of the bush is thereby simplified, resulting in reduced cost. The simplified bush structure makes it possible to reduce the axial length of the whole clutch assembly.

DETAILED DESCRIPTION OF THE INVENTION

Detailed description of the present invention will be described as follows referring to the accompanying drawings.

Figure 3:
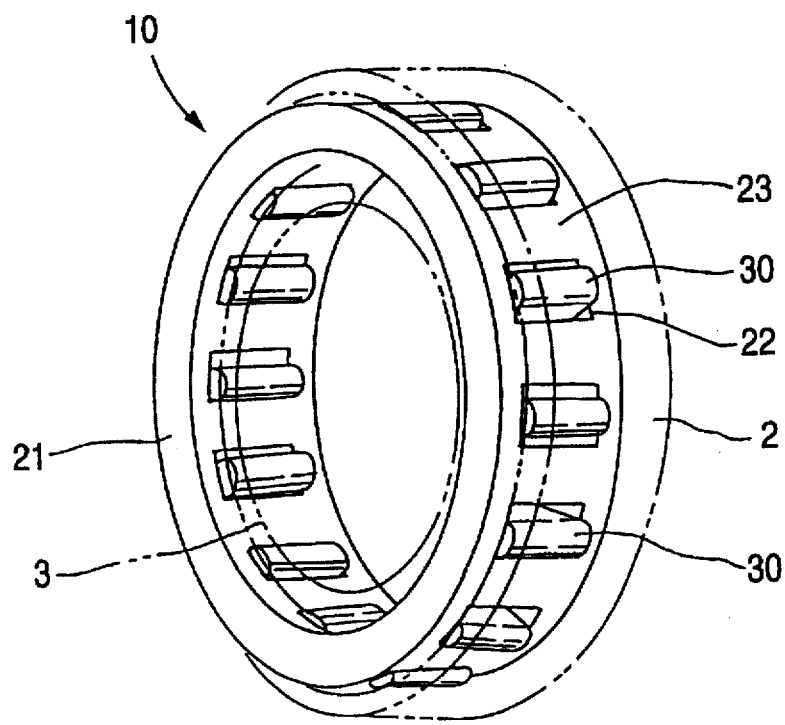
FIG. 3 is a perspective view of one example of a cage ring used in the invention.
Figure 4:
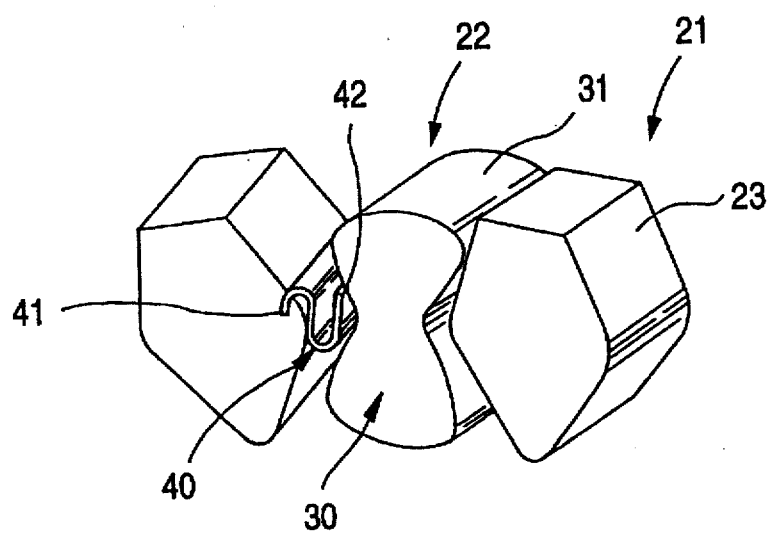
FIG. 4 is an enlarged view of the main portions of the cage ring shown in FIG. 3.
Figure 5:
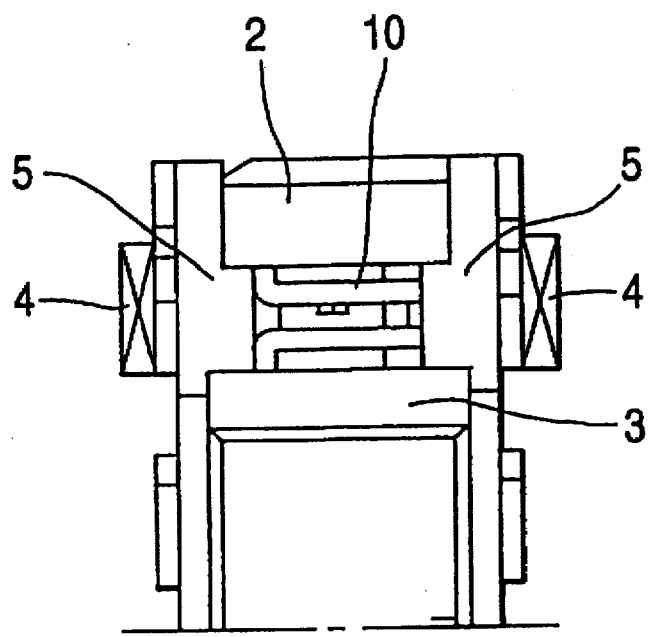
FIG. 5 is a section view of a conventional sprag clutch of a double cage type.

FIG. 3 is a perspective view of an embodiment of a one-way clutch assembly which is used in the present invention, and FIG. 4 shows a structure of the main portions of the above one-way clutch assembly, in which an outer race 2 and an inner race 3 are shown using phantom lines. In the drawings, reference numeral 21 designates a cage ring which is formed into an integral body as a whole. The cage ring 21 includes a plurality of openings 22 and the portions of the cage ring 21 existing between the openings 22 respectively extend in the axial direction of the cage ring 21 to thereby provide a series of cam members 23 which are arranged at regular intervals in the circumferential direction of the cage ring 21. Sprags 30 are respectively held in the openings 22. Reference numeral 31 designates a wedge surface which connects the inner and outer races with each other.

The cage ring 21 is preferably formed of plastic which is industrially synthesized at high temperatures such as polyether imide, nylon or the like.

As shown in FIG. 4, the sprag 30 is supported in the opening 22 by an urging element 40. In FIG. 4, the urging element 40 is structured so as to include a mounting portion 41 and a tongue portion 42. However, this is not limitative as any other arbitrary structure can also be employed. For example, the urging element 40 may be formed of metal, or high temperature elastomer such as nitrile rubber, silicone, fluoroelastomer, Neoprene, polyurethane or the like. In this case, preferably, the urging elements 40 are provided independently of each other, namely, each of the urging elements are not integrated with each other.

As described above, since the cage ring 21 used in the invention is formed as an integral body except for the openings 22 for holding the sprags 30, it functions to support the inner and outer races.

Figure 1:
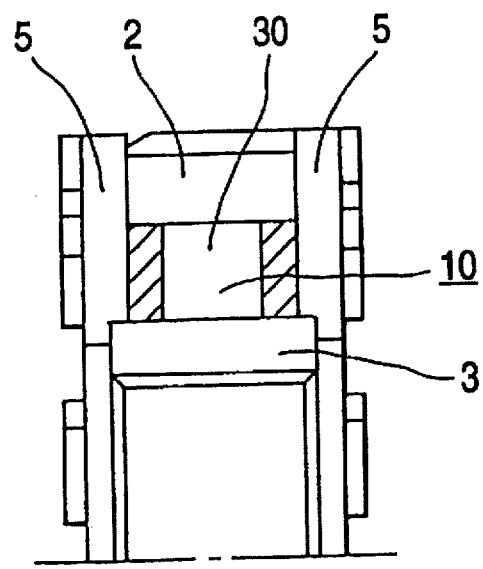
FIG. 1 is an explanatory view of a first embodiment of a one-way clutch according to the invention.

FIG. 1 shows a first embodiment of a one-way clutch assembly according to the invention, in which reference numeral 10 designates a one-way clutch and 30, a sprag located within the one-way clutch 10. The cage ring 21 of the one-way clutch used in the invention as described above has an integrally formed body including the axially extending cam members 23 and thus has a function to support the outer race 2 and inner race 3. Consequently, the bush 5 can be structured so as not to have a function to support the inner and outer races. This makes it possible not only to simplify the structure of the bush 5 but also to reduce the axial length of the whole clutch assembly.

Figure 2:
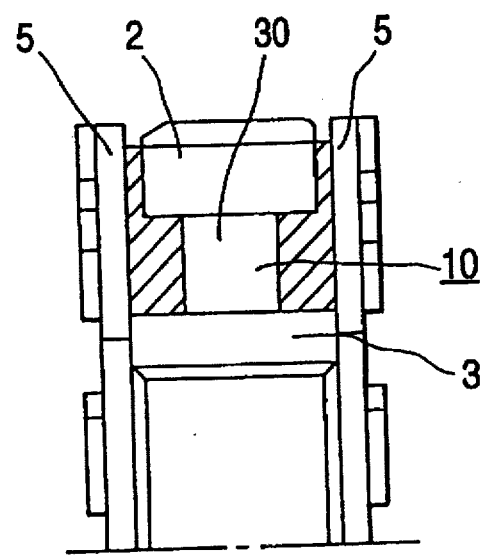
FIG. 2 is an explanatory view of a second embodiment of a one-way clutch according to the invention.

FIG. 2 shows a second embodiment of a one-way clutch assembly according to the invention, in which a cage ring and an outer race 2 are united integrally with each other into one body so that can be rotated in the circumferential direction with respect to one another. This structure makes it possible to further simplify the structure of the bush 5. In FIG. 2 as well, similarly to FIG. 1, reference numeral 2 designates an outer race and 30, a sprag.

As described above, by assembling the cage ring and outer race 2 at the same time, the number of the assembling steps of the present one-way clutch assembly can be reduced and thus the assembling cost thereof can be lowered accordingly.

What is claimed is:

1. A one-way clutch for a stator of a torque converter, comprising:

a cage ring;

a plurality of cam members respectively arranged at regular intervals about the circumference of said cage ring, each of said cam members being aligned with an axial direction of said cage ring;

a plurality of sprags respectively stored in openings formed between said cam members;

a plurality of urging elements, each of said urging elements being held in a respective one of said openings and being arranged to support a respective one of said sprags; and an outer race assembled integrally with said cage ring, wherein said cage ring and said outer race are restricted from moving with respect to one another in the axial direction of said cage ring and in a radial direction of said cage ring, and wherein said cage ring is permitted to rotate circumferentially with respect to said outer race.

2. The one-way clutch for a stator of a torque converter according to claim 1, wherein said cage ring is formed of plastic.

3. The one-way clutch for a stator of a torque converter according to claim 1, wherein said urging elements are provided independently of each other.

4. The one-way clutch for a stator of a torque converter according to claim 1, wherein each of said urging elements are provided between a respective one of said cam members and said respective one of said sprags.

5. The one-way clutch for a stator of a torque converter according to claim 1, wherein said cam members are formed integrally with said cage ring.

6. The one-way clutch for a stator of a torque converter according to claim 1, further comprising:

an inner race, said cage ring being disposed between said inner race and said outer race, wherein said cage ring supports both said inner race and said outer race.

7. A one-way clutch for a stator of a torque converter, comprising:

a cage ring;

a plurality of cam members respectively arranged at regular intervals about the circumference of said cage ring, each of said cam members being aligned with an axial direction of said cage ring;

a plurality of sprags respectively stored in openings formed between said cam members;

a plurality of urging elements, each of said urging elements being held in a respective one of said openings and being arranged to support a respective one of said sprags;

an outer race; and an inner race, wherein said cage ring is disposed between said inner race and said outer race, said cage ring supporting both said inner race and said outer race, and wherein said cage ring is permitted to rotate circumferentially with respect to said outer race and said inner race.

8. The one-way clutch for a stator of a torque converter according to claim 7, wherein said cage ring is formed of plastic.

9. The one-way clutch for a stator of a torque converter according to claim 7, wherein said urging elements are provided independently of each other.

10. The one-way clutch for a stator of a torque converter according to claim 7, wherein each of said urging elements are provided between a respective one of said cam members and said respective one of said sprags.

11. The one-way clutch for a stator of a torque converter according to claim 7, wherein said cam members are formed integrally with said cage ring.

* * * * *